(12) United States Patent
Coleman et al.

(10) Patent No.: US 6,481,785 B1
(45) Date of Patent: Nov. 19, 2002

(54) DUMP BODY

(75) Inventors: Mark Allan Coleman, Kalgoorlie (AU); Stephen Charles Routledge, Kalgoorlie (AU)

(73) Assignee: Haul Supreme PTY LTD, Perth (AU)

( * ) Notice: Subject to any disclaimer, the term of this patent is extended or adjusted under 35 U.S.C. 154(b) by 0 days.

(21) Appl. No.: 09/530,644

(22) PCT Filed: Oct. 22, 1998

(86) PCT No.: PCT/AU98/00879

§ 371 (c)(1),
(2), (4) Date: May 3, 2000

(87) PCT Pub. No.: WO99/22957

PCT Pub. Date: May 14, 1999

(30) Foreign Application Priority Data

Nov. 4, 1997 (AU) .............................................. PP0199

(51) Int. Cl.$^7$ .............................................. B62D 33/00
(52) U.S. Cl. ...................................... 296/184; 298/17 R
(58) Field of Search ................................ 296/183, 184, 296/190.03; 280/790; 298/1 R, 17 R, 1 B

(56) References Cited

U.S. PATENT DOCUMENTS

| | | | | |
|---|---|---|---|---|
| 2,490,532 A | * | 12/1949 | Maxon, Jr. | 298/22 P |
| 2,557,082 A | * | 6/1951 | Double | 298/17 R |
| 2,639,187 A | * | 5/1953 | Grumbache | 296/37.6 |
| 2,886,374 A | * | 5/1959 | Meats | 296/184 |
| 2,925,301 A | * | 2/1960 | Milligan | 296/204 |
| 2,974,997 A | * | 3/1961 | Parsley et al. | 296/183 |
| 3,039,493 A | * | 6/1962 | Licari | 137/625.44 |
| 3,171,670 A | * | 3/1965 | Domes | 280/124.17 |
| 3,181,909 A | * | 5/1965 | Wise | 296/10 |
| 3,208,790 A | * | 9/1965 | Domes | 296/184 |
| 3,331,433 A | * | 7/1967 | Hagberg | 165/51 |
| 3,363,933 A | * | 1/1968 | Wilson | 296/184 |
| 3,462,187 A | * | 8/1969 | Hassler | 296/184 |
| 3,578,375 A | * | 5/1971 | Finefrock | 296/39.2 |
| 3,652,123 A | * | 3/1972 | Speers | 296/184 |
| 3,923,337 A | * | 12/1975 | Kershaw et al. | 296/197 |
| 4,116,486 A | * | 9/1978 | Duttarer | 298/17 R |
| 4,162,096 A | * | 7/1979 | Proeschl | 296/196 |
| 4,357,048 A | * | 11/1982 | Zehnder et al. | 296/183 |
| 4,425,002 A | * | 1/1984 | Coleman et al. | 298/1 R |
| 4,474,404 A | * | 10/1984 | Hagenbuch | 296/184 |
| 4,531,781 A | | 7/1985 | Hunt et al. | 298/22 P |
| 5,431,475 A | * | 7/1995 | Perry | 296/181 |
| 5,505,583 A | * | 4/1996 | Gaddis et al. | 414/526 |
| 5,851,043 A | * | 12/1998 | Moutrey et al. | 296/39.2 |
| 6,129,409 A | * | 10/2000 | D'Amico | 296/184 |

FOREIGN PATENT DOCUMENTS

| | | |
|---|---|---|
| FR | 1145351 | 10/1957 |
| FR | 2232206 | 12/1974 |
| FR | 2 637 863 | 10/1989 |

OTHER PUBLICATIONS

International Search Report dated Dec. 3, 1998, prepared by Australian Patent Office.

* cited by examiner

*Primary Examiner*—D. Glenn Dayoan
*Assistant Examiner*—Patricia L. Engle
(74) *Attorney, Agent, or Firm*—Merchant & Gould P.C.

(57) ABSTRACT

A dump body (10) for a load carrying vehicle having a floor (11), side walls (12, 13) and a head board (14) at the forward end of the dump body (10), the head board (14) comprising a generally upright panel (17) extending between the floor (11) and side walls (12, 13) and a forward panel (20) extending forwardly from the upper edge of the upright panel (17), the connection between the forward panel (20) and upright panel (17) comprising a first torsion member (19) fixed between the side walls (12, 13), the upper edge of the upright panel (20) being fixed at one or more locations along the length of the first torsion member (19) and the forward panel (20) being fixed at a plurality of locations to the first torsion member (19). In a second embodiment of the dump body (10) the floor (11) is defined by a panel removably mounted to the dump body (10).

10 Claims, 6 Drawing Sheets

US 6,481,785 B1

DUMP BODY

FIELD OF THE INVENTION

The present invention relates to the dump body of a load carrying vehicle.

BACKGROUND ART

The invention has application to load carrying vehicles of the form to be used in earth moving and mining activities and which are used to carry earth and ore. Such vehicles can have a pay load capacity of the order of 100–200 tonnes. Generally the dump body of such vehicles comprises a floor, side walls and a headboard, and because of the magnitude of the load being carried, the nature of the materials being carried which may comprise large pieces of rock and the manner in which the material can be delivered into the vehicle the dump body must be constructed to be sufficiently robust to be able to withstand the forces exerted upon the dump body during loading of the materials, transporting the materials and depositing the materials. As a result of conventional design parameters it is established practice to construct the dump bodies to be able to withstand the anticipated forces such that as a result the, dump bodies have a significant tare weight. This considerable tare weight significantly reduces the pay load capacity of the vehicle as well as resulting in additional wear and tear on the vehicle and a significant consumption of fuel and consumables, such as tyres.

It is an object of this invention to provide a construction for a dump body which is able to significantly reduce the tare weight of the dump body.

DISCLOSURE OF THE INVENTION

Accordingly in one aspect the invention resides in a dump body for a load carrying vehicle having a floor, side walls at each side and a head board at the forward end of the dump body, the headboard comprising a generally upright panel extending between the floor and side walls and a forward panel extending forwardly from the upper edge of the upright panel, the connection between the forward panel and upright panel comprising a first torsion member fixed between the side walls, the upper edge of said upright panel being fixed at one or more locations along the length of the first torsion member and the forward panel being fixed at a plurality of locations to the first torsion member and wherein the forward panel comprises a plurality of panels each interconnected by a further torsion member extending between the sides of the forward panels, said further torsion members being parallel to the first torsion member.

According to a preferred feature of the invention a side panel extends along each side of the forward panel from each side wall and is fixed to the side wall and each side of the forward panel.

According to a further preferred feature of the invention the junction between the upright panel and the floor is of an arcuate profile.

According to a further preferred feature of the invention the junction between the each side wall and the floor is of an arcuate profile.

According to a further preferred feature the upright panel is forwardly inclined.

According to a further preferred feature the floor is defined by a panel which is removably mounted to the dump body. Accordingly to a further feature of the invention the panel is reversible. According to one embodiment the panel is supported by a support frame adapted to be mounted to the chassis of the load carrying vehicle, and said panel extends transversely between the side walls and longitudinally between the front wall and the rear of the body, said panel being fixed to the support frame by a plurality of removable fixings located at spaced locations on the panel which are adapted to be engagable with the support frame to clampingly retain the panel in position on the support frame.

According to another aspect the invention resides in a dump body for a load carrying vehicle having a floor, side walls at each side and a head board wherein the floor is supported by a support frame adapted to be mounted to the chassis of the load carrying vehicle, said floor being defined by a panel which extends transversely between the side walls and longitudinally between the front wall and the rear of the body, said panel being fixed to the support frame by a plurality of removable fixings located at spaced locations on the panel which are adapted to be engagable with the support frame to clampingly retain the panel in position on the support frame, said panel being configured to be reversible in the fore and aft axis of the dump body.

According to a preferred feature of the invention packing in the form of a resilient material is provided between the floor and the base frame of the dump body. According to alternative embodiments of the invention the packing comprises a high density polyethylene or polyurethane.

According to a further preferred feature of the invention the fixings are located at spaced intervals around the edge of the floor and at intermediate locations on the floor.

The invention will be more fully understood in the light of the following description of one specific embodiment.

BRIEF DESCRIPTION OF THE DRAWINGS

The description is made with reference to the accompanying drawings of which.

DESCRIPTION OF THE EMBODIMENT OF THE INVENTION

The embodiment is directed to a form of dump body of the form which is intended for use with the load carrying of vehicles such as those known under the trade mark "HAUL-PAK".

It is an object of the embodiment to provide a dump body which is of reduced tare weight in order to improve the load carrying capacity of the vehicle and to reduce the wear and tear on the vehicle when not under load and to reduce the wear and tear on the vehicle when under load.

Figure 1:
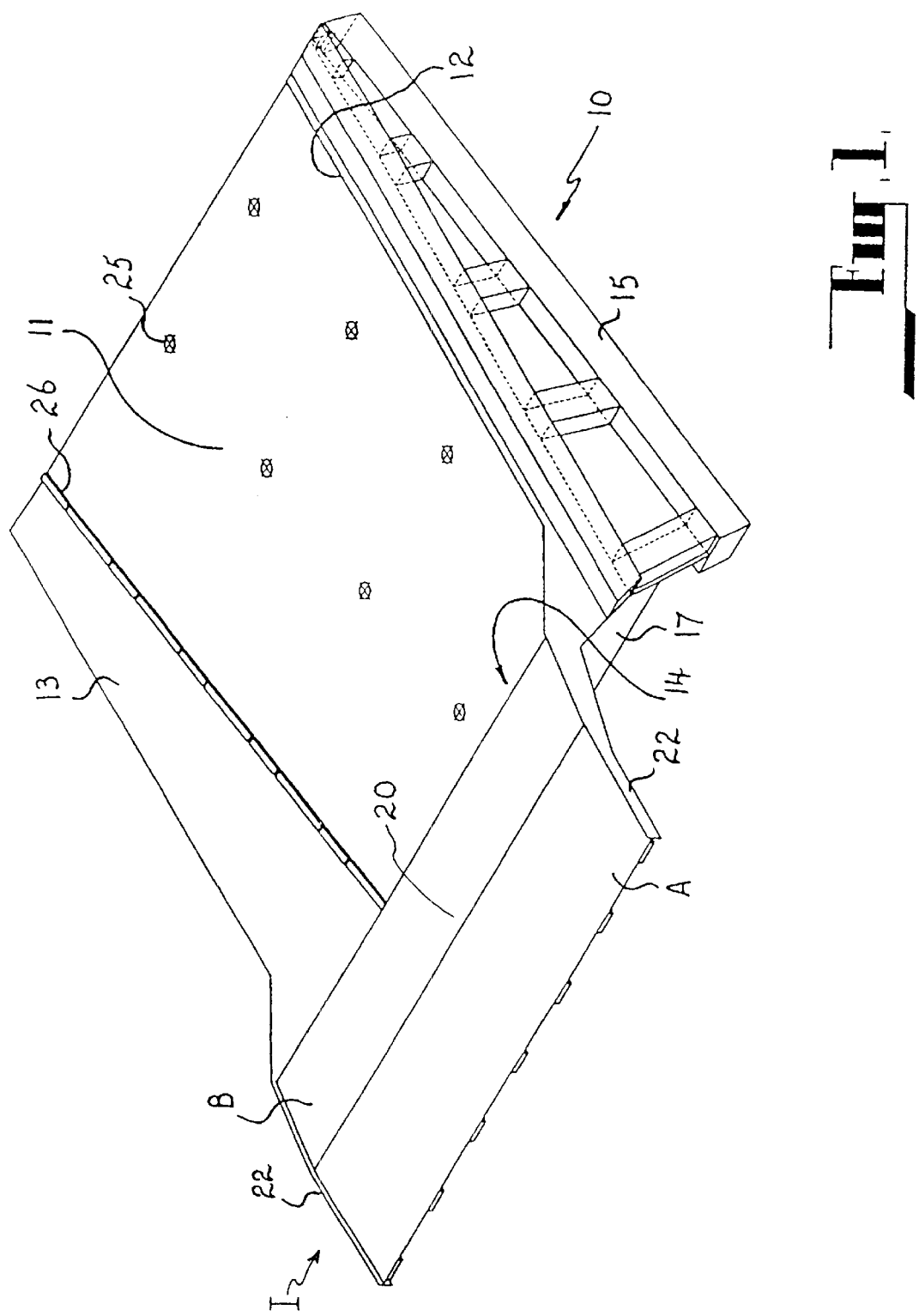
FIG. 1 is an upper isometric view of the embodiment.
Figure 2:
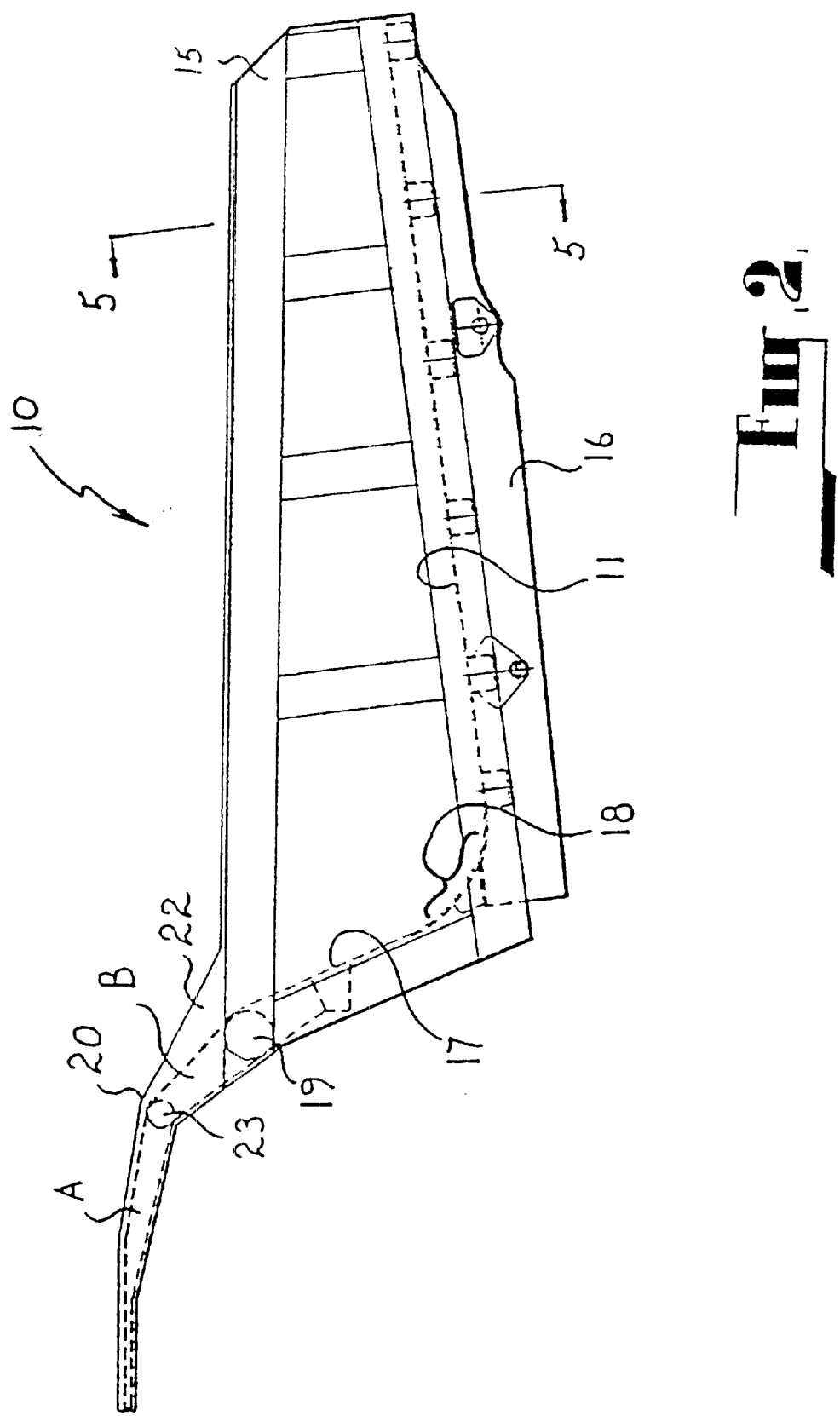
FIG. 2 is a side elevation of a dump body according to the embodiment.
Figure 3:
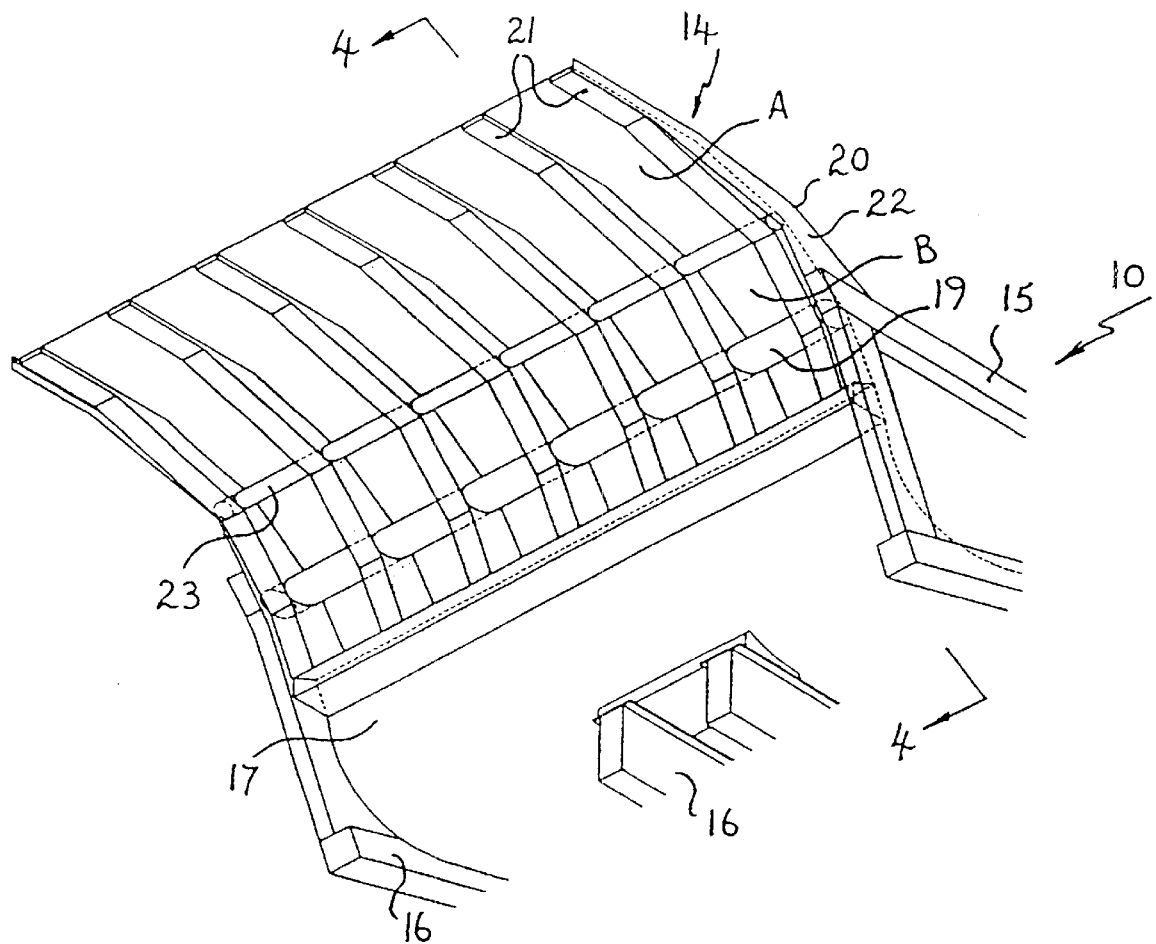
FIG. 3 is a partial underneath isometric view of the dump body according to the first embodiment.
Figure 4:
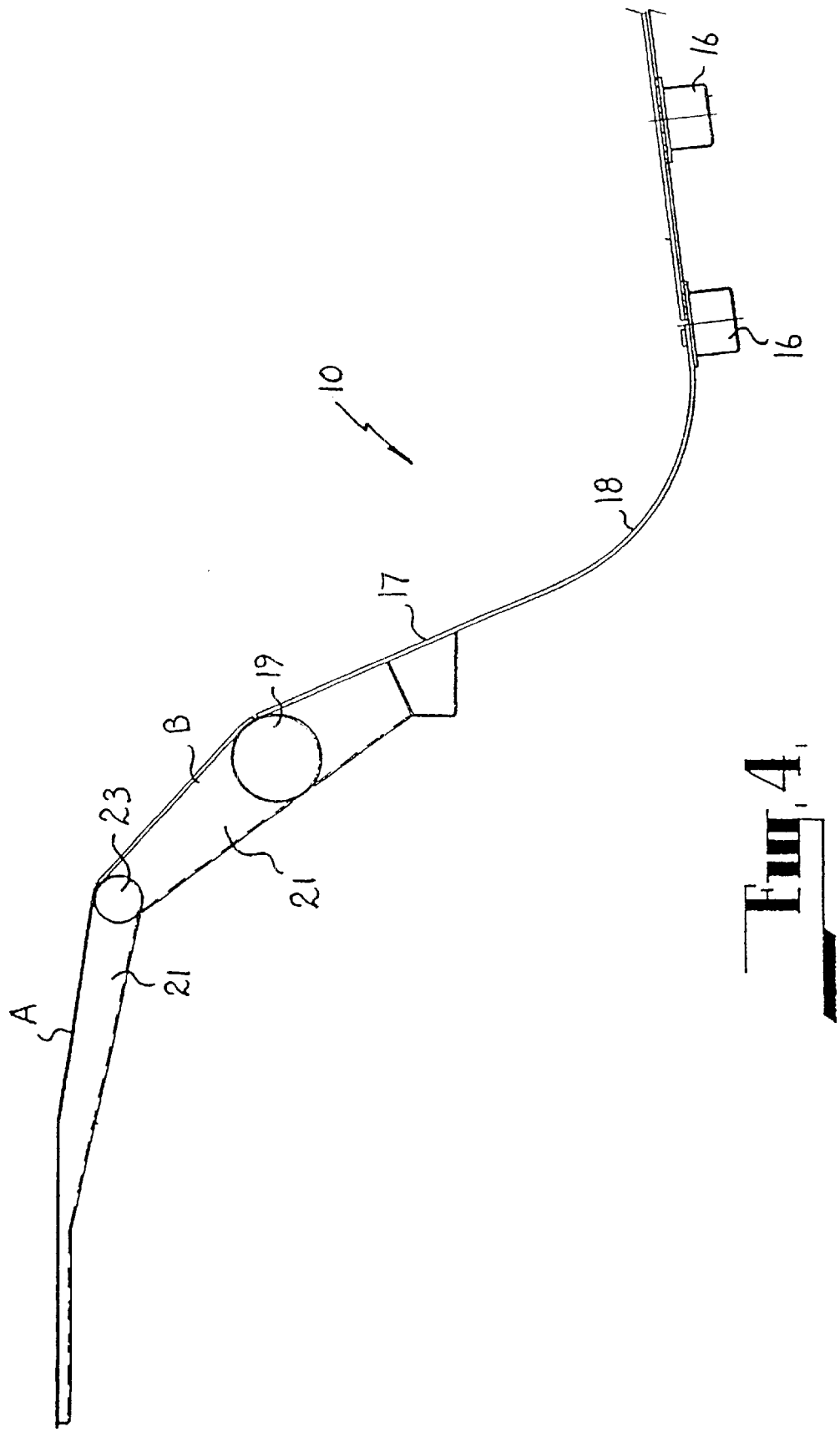
FIG. 4 is a sectional view along line 4—4 of FIG. 3.
Figure 5:
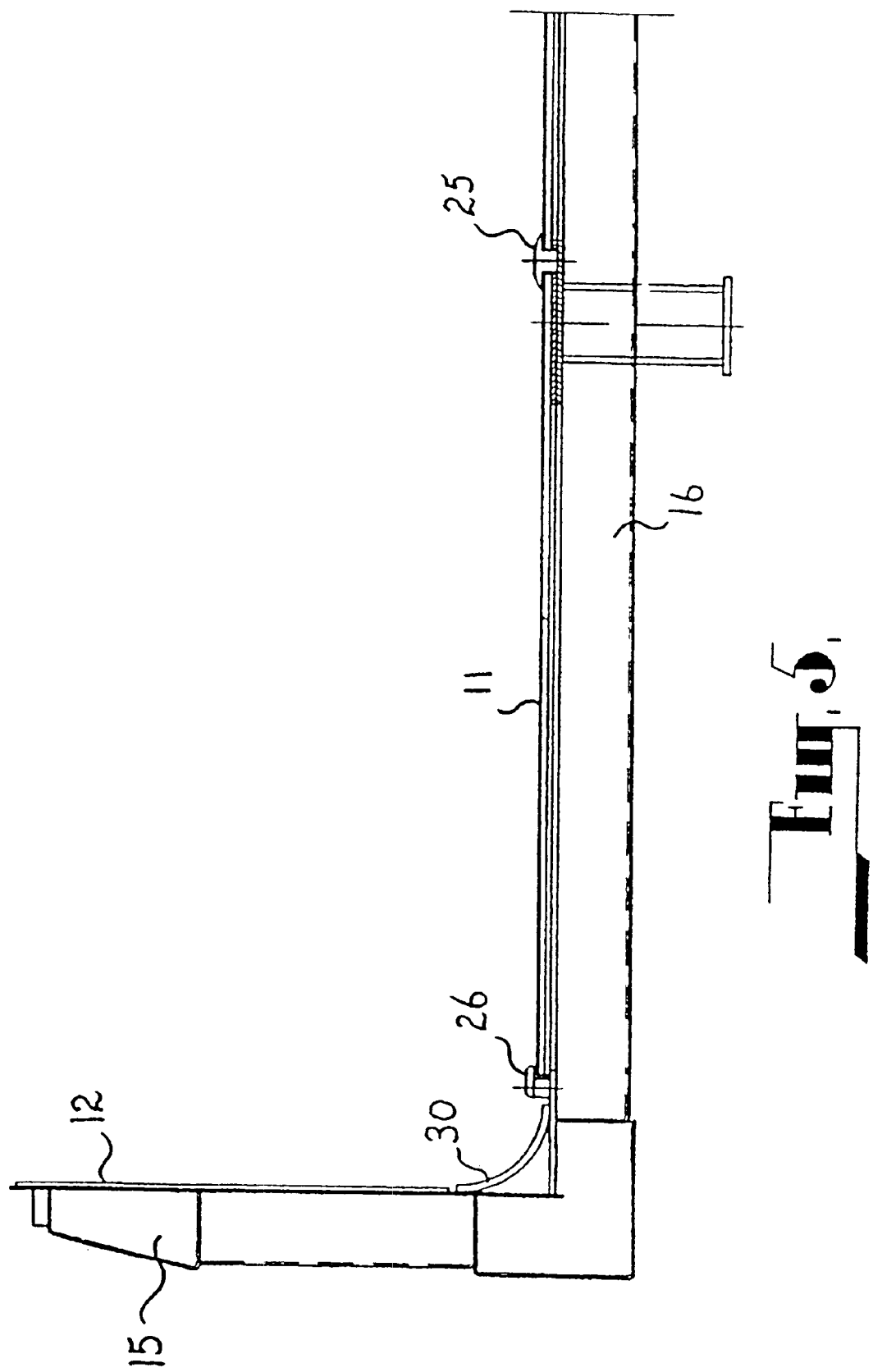
FIG. 5 is a part sectional view along line 5—5 of FIG. 2.

The embodiment shown in the drawings comprises a dump body 10 having a floor 11 side walls 12 and 13 and a head board 14. The floor and side walls are associated with suitable side frames 15 and base frame 16 which are of generally conventional design in order to provide the structural integrity for the floor and side walls of the body. The floor according to the embodiment is generally planar and is inclined downwardly from the rearmost edge to the forwardmost edge while the side walls 12 and 13 are substantially upright. In addition the junction between the side walls 12 and 13 and the floor is closed by an arcuate member 30 as shown at FIG. 5.

The head board 14 which is provided at the forward end of the dump body comprises a first upright panel 17 which extends upwardly from the floor 11 between the side walls and is forwardly inclined from the floor 11. The junction 18 between the floor 11 and the upright panel 17 is of an arcuate configuration. This arcuate configuration serves to facilitate the flow of materials from the body when the body is being tipped rearwardly to deposit its contents and to promote the flow of materials being delivered into the dump body during the loading of the body such that the materials are directed towards the floor 11 of the dump body.

In accordance with conventional practice and in order to provide protection for the drivers cab of the vehicle the head board further comprises a forward panel 20 which extends forwardly from the upright panel 17. However, in the case of the embodiment the upper edge of the upright panel 17 is defined by a first transverse torsion tube 19 which is mounted between the side frames 15 of the side walls 12 and 13 and the forward platform I supported at least in part from the torsion tube 19. In order to be so supported, the forward platform comprises a plurality of forwardly extending parallel gusset members 21 which are positioned at spaced intervals across the underneath of the platform of forward panel 20 and the gusset members 21 are fixed at their rearward end to the first torsion tube 19 to be supported thereby. In addition a side panel 22 is provided along each side of the forward panel 20 and is fixed at its rearward end to the respective side wall 12 and 13. In addition the forward panel 20 itself comprises a pair of panels A and B which are supported from each other by a second torsion tube 23 which is parallel to the first torsion tube 19 and where the portions of the gusset frames 21 for each portion are mounted to opposed sides of the second torsion tube 23

In use the forward panel 20 serves to provide protection for the cab of the load carrying vehicle against any materials which are inadvertently dumped into the dump body forward of the floor 11 or which may move forwardly from the dump body.

The construction of the dump body according to the embodiment whereby support for the forward panel is effected by the utilisation of the torsion tubes 19 and 23. This form of construction serves to significantly reduce the tare weight of the dump body compared to the conventional design of dump bodies without reducing the desired strength of the forward panel 20 or compromising the strength of the dump body.

As a further means of reducing the tare weight of the dump body the floor 11 is defined by a removable panel 11 which is received upon the base frame 16 and is held in position by suitable intermediate fixings 25 and lateral fixings 26. The intermediate fixings 25 (see FIG. 6) serve in fixing the floor 11 to the base frame at intermediate locations on the panel while the side fixings 26 serve in fixing the lateral edges of the floor 11 to the base frame 16 (see FIG. 7).

Figure 6:
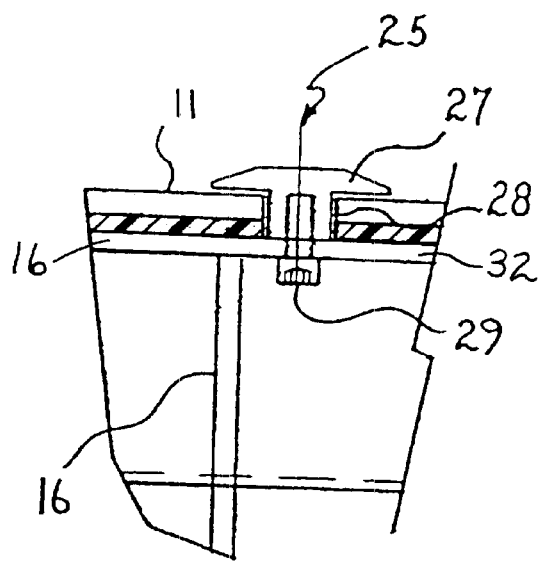
FIG. 6 is an enlarged detail of the intermediate fixing means for the floor panel.

As shown at FIG. 6 the intermediate fixings 25 comprise a head member 27 having an enlarged head and a downwardly depending central tubular spigot which is received through an aperture 28 provided in the floor 11. The head is associated with a suitable screw 29 engagable with the tubular spigot from underneath the base frame 16 through an aperture in the base frame.

In addition a suitable packing 32 in the form of a resilient material such as high density polyethylene or polyurethane is provided between the floor panel 11 and the base frame 16 to be clampingly engaged therebetween when the fixings 25 and 26 are tightened.

In addition a suitable packing in the form of a resilient material such as high density polyethylene or polyurethane is provided between the floor and the base frame 16 to be clampingly engaged therebetween when the fixings 25 and 26 are tightened.

According to conventional practice the floor of a dump body is welded to the frame structure to form part of the integral structure of the body. When the floor has to be replaced it is necessary to remove the dump body from the vehicle, cut the floor panel away from the frame, replace the floor panel by a fresh floor panel and weld the fresh–floor panel into position. This is an extremely time consuming activity, is very labor intensive and results in considerable down-time for the dump body.

The embodiment provides a means, whereby when it becomes necessary to replace the floor, the intermediate fixings 25 and side fixings 26 are removed, the floor panel is lifted from engagement with the dump body to be replaced by a fresh panel and the fresh panel is fixed in position by means of the fixings 25 and 26. In addition the embodiment enables the floor panel 11 to be reversed in its position in the dump body. In this regard it is usual that the rearward portion of the floor will wear at a faster rate than the forward portion. As a result it is possible that on a certain degree of wear being noticed of the rearward portion of the floor panel, it can be removed and reversed in position such that the utilisation of the floor panel is maximised.

It is a further feature of the embodiment that the tare weight of the dump body is also considerably reduced as a result of the structure and construction of the floor.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiment described above.

What is claimed is:

1. A dump body for a load carrying vehicle having a floor, side walls at each side and a head board wherein the floor is supported by a support frame adapted to be mounted to the chassis of the load carrying vehicle, said floor being defined by a single unitary panel which extends transversely between the side walls and longitudinally between the front wall and the rear of the body, said unitary panel being fixed to the support frame by a plurality of removable fixings located at spaced locations on the unitary panel which are adapted to be engagable with the support frame to clampingly retain the unitary panel in position on the support frame, said unitary panel being configured to be reversible in the fore and aft axis of the dump body.

2. A dump body as claimed at claim 1 wherein the fixings are located at spaced intervals around the edge of the floor panel and at intermediate locations on the floor panel.

3. A dump body as claimed at claim 1 wherein packing in the form of a resilient material is provided between the floor panel and the support frame of the dump body.

4. A dump body as claimed at claim 3 wherein the packing comprises a high density polyethylene or polyurethane.

5. A dump body as claimed at claim 3 wherein the fixings are located at spaced intervals of the floor panel and at intermediate locations on the floor panel.

6. A dump body as claimed at claim 1 wherein the floor panel is easily removable and replaceable.

7. A dump body for a load carrying vehicle having a floor, side walls at each side and a head board wherein the floor is supported by a support frame adapted to be mounted to the chassis of the load carrying vehicle, said floor being defined by a panel which extends transversely between the side walls and longitudinally between the front wall and the rear of the body, said panel being fixed to the support frame by a plurality of removable fixings located at spaced locations on the panel which are adapted to be engagable with the support frame to clampingly retain the panel in position on the support frame, said panel being configured to be reversible in the fore and aft axis of the dump body, and wherein packing in the form of a resilient material is provided between the floor and the support frame of the dump body.

8. A dump body for a load carrying vehicle having a floor, side walls at each side and a head board wherein the floor is supported by a support frame adapted to be mounted to the chassis of the load carrying vehicle, said floor being defined by a panel which extends transversely between the side walls and longitudinally between the front wall and the rear of the body, said panel being fixed to the support frame by a plurality of removable fixings located at spaced locations on the panel which are adapted to be engagable with the support frame to clampingly retain the panel in position on the support frame, said panel being configured to be reversible in the fore and aft axis of the dump body, and wherein packing comprising a high density polyethylene or polyurethane is provided between the panel and the support frame of the dump body.

9. A dump body for a load carrying vehicle, comprising:

a) a floor, b) two opposing side walls located on opposing sides of said floor;

c) a head board generally located between said two opposing side walls and along a front edge of said floor; and d) a support frame adapted to be mounted to the chassis of the load carrying vehicle, said support frame being arranged and configured to support said floor, and wherein said floor is defined by a single unitary panel which extends transversely between said side walls and longitudinally between said head board and the rear of the body, said unitary panel being fixed to said support frame by a plurality of removable fixings located at spaced locations on said unitary panel which are adapted to be engagable with said support frame to clampingly retain said unitary panel in position on said support frame, said unitary panel being configured to be reversible in the fore and aft axis of the dump body.

10. A dump body as claimed at claim 9, further comprising packing in the form of a resilient material, said packing located between said floor panel and said support frame of the dump body.

* * * * *

UNITED STATES PATENT AND TRADEMARK OFFICE
CERTIFICATE OF CORRECTION

PATENT NO.      : 6,481,785 B1                                            Page 1 of 1
DATED           : November 19, 2002
INVENTOR(S)     : Coleman et al.

Figure 7:
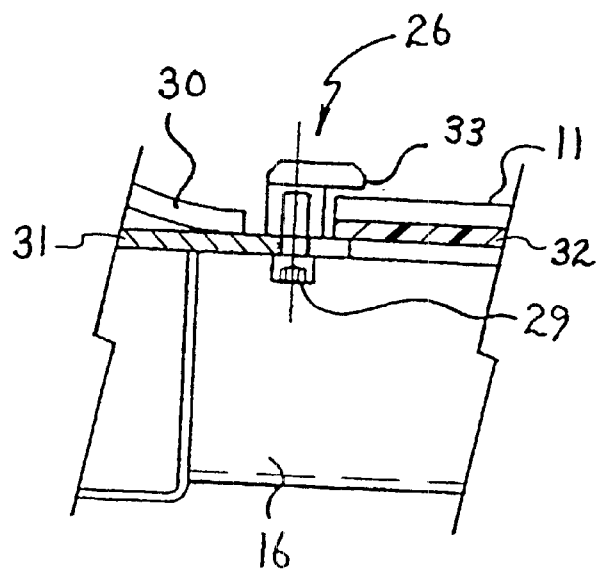
FIG. 7 is an enlarged detail of the edge fixing means provided for the floor panel along the edges.

It is certified that error appears in the above-identified patent and that said Letters Patent is hereby corrected as shown below:

Column 4,
Line 4, please add the following paragraph:

-- As shown at Figure 7 the side fixings 26 comprise lug members which have a laterally directed flange 33 to be receivable along the edges of the floor panel 11 and which are engaged by suitable screws 29 from underneath side support plates 31 associated with the frame 16. --
Line 9 through line 13, delete the paragraph beginning with "In addition a suitable packing in the form" and ending with "26 are tightened."

Column 5,
Line 4, "are located at spaced intervals of the floor" should read -- are located at spaced intervals around the edge of the floor --

Signed and Sealed this

Fifteenth Day of July, 2003

JAMES E. ROGAN
*Director of the United States Patent and Trademark Office*